US010215238B2

(12) United States Patent
Ohr et al.

(10) Patent No.: US 10,215,238 B2
(45) Date of Patent: Feb. 26, 2019

(54) WEDGE CLUTCH WITH OPPOSING THRUST FORCES

(71) Applicant: Schaeffler Technologies AG & Co. KG, Herzogenaurach (DE)

(72) Inventors: Carsten Ohr, Charlotte, NC (US); Brian Lee, York, SC (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 463 days.

(21) Appl. No.: 15/011,850

(22) Filed: Feb. 1, 2016

(65) Prior Publication Data

US 2017/0219022 A1 Aug. 3, 2017

(51) Int. Cl.
  *F16D 15/00* (2006.01)
  *F16D 25/12* (2006.01)
  *F16D 28/00* (2006.01)
  *F16D 23/12* (2006.01)

(52) U.S. Cl.
  CPC .......... *F16D 15/00* (2013.01); *F16D 25/12* (2013.01); *F16D 28/00* (2013.01); *F16D 2023/123* (2013.01)

(58) Field of Classification Search
  None
  See application file for complete search history.

(56) References Cited

U.S. PATENT DOCUMENTS

| 837,732 | A | * | 12/1906 | Riley | |
|---|---|---|---|---|---|
| 1,015,250 | A | * | 1/1912 | Roof | F16D 55/10 192/70 |
| 2,351,876 | A | * | 6/1944 | Peterson | F16D 25/0632 192/70 |
| 2,352,829 | A | * | 7/1944 | Forbes | F16D 55/06 188/18 A |
| 2,675,898 | A | * | 4/1954 | Morgan | F16D 41/22 192/104 R |
| 2,883,024 | A | * | 4/1959 | Emrick | F16D 15/00 192/45.1 |
| 3,547,243 | A | * | 12/1970 | Joern | F16D 25/0632 192/209 |
| 4,569,428 | A | * | 2/1986 | Forsythe | F16D 25/04 192/113.21 |
| 2015/0083539 | A1 | | 3/2015 | Lee et al. | |

* cited by examiner

*Primary Examiner* — Colby M Hansen

(57) ABSTRACT

A wedge clutch, including: a first hub; a second hub; an outer ring located radially outward of the first and second hubs; a first wedge plate radially disposed between the first hub and the outer ring; a second wedge plate radially disposed between the second hub and the outer ring; and a displacement element disposed between the first and second hubs and arranged to for a connect mode, in which the first and second hubs are non-rotatably connected to the outer ring, block axial displacement of the first and second hubs with respect to each other, and for a disconnect mode, axially displace the first and second hubs with respect to each other to enable rotation between the outer ring and the first and second hubs.

20 Claims, 8 Drawing Sheets

WEDGE CLUTCH WITH OPPOSING THRUST FORCES

TECHNICAL FIELD

Described herein is a wedge clutch with two cone-shaped hubs and respective wedge plates. The taper of the hubs results in thrust forces which cancel each other out during a connect (closed) mode for the clutch. Cancellation of the thrust forces eliminates undesirable axial shifting of the hubs during the connect mode.

BACKGROUND

FIG. 8 is a cross-sectional view of prior art wedge clutch 200. Clutch 200 includes hub 202, wedge plate 204, and outer ring 206. Actuation force AF is applied in axial direction AD1 to close clutch 200 (connect mode). Wedge clutch 200 exhibits a tendency to disconnect during the connect mode caused by an axial movement of the hub as follows. Taper angle 208 between wedge plate 204 and hub 202 causes thrust force TF in direction AD2, opposite direction AD1. For increasing torque hub 202 is held approximately in a same axial position due to frictional contact at the connection, for example a spline, between hub 202 and a shaft (not shown). When the relative rotation direction between hub 202 and outer ring 206 changes, torque immediately disappears, while contact forces are still present in the system. As a result, thrust force TF created at the taper between hub 202 and wedge plate 204 pushes hub 202 in axial direction AD2 until thrust force TF is smaller than actuation force AF. At that point, actuation force AF pushes hub 202 back to the original and desired axial location.

The displacement of hub 202 in direction AD2 during the connect mode weakens the connection between wedge plate 204 and hub 202, which can lead to loss of the non-rotatable connection between plate 204 and hub 202 and ring 206 and subsequent opening of clutch 200. Also, if force TF pushes hub 202 far enough in direction AD2, end 210 of hub 202 can extend partly or wholly past wedge plate 204 in direction AD2, either compromising or disabling the functioning of clutch 200. Further, if only partial cycles of torque application are experienced by clutch 200, that is, if clutch 200 is not fully displaced back in direction AD1 by each partial cycle, each successive cycle displaces hub 202 further in direction AD2 for the beginning of the next cycle. As a result, the successive partial cycles can "walk" hub partially or wholly past wedge plate 204 in direction AD2.

SUMMARY

According to aspects illustrated herein, there is provided a wedge clutch, including: a first hub; a second hub; an outer ring located radially outward of the first and second hubs; a first wedge plate radially disposed between the first hub and the outer ring; a second wedge plate radially disposed between the second hub and the outer ring; and a displacement element axially disposed between the first and second hubs and arranged to for a connect mode, in which the first and second hubs are non-rotatably connected to the outer ring, block axial displacement of the first and second hubs with respect to each other, and for a disconnect mode, axially displace the first and second hubs with respect to each other to enable rotation between the outer ring and the first and second hubs.

According to aspects illustrated herein, there is provided a wedge clutch, including: a first hub including a first surface sloping radially outward in a first axial direction; a second hub including a second surface sloping radially outward toward the first hub in a second axial direction opposite the first axial direction; an outer ring located radially outward of the first and second hubs; a first wedge plate radially disposed between the first hub and the outer ring and engaged with the first surface; a second wedge plate radially disposed between the second hub and the outer ring and engaged with the second surface; and a displacement element arranged to for a connect mode, block axial displacement of the first and second hubs with respect to each other, and for a disconnect mode, axially displace the first and second hubs with respect to each other to enable rotation between the outer ring and the first and second hubs.

According to aspects illustrated herein, there is provided a wedge clutch, including: a first hub; a second hub; an outer ring located radially outward of the first and second hubs; a first wedge plate radially disposed between the first hub and the outer ring and in contact with the first hub; a second wedge plate radially disposed between the second hub and the outer ring and in contact with the second hub; and a displacement element arranged to for a connect mode, displace the first and second hubs axially away from each other to non-rotatably connect the first and second hubs to the outer ring and block axial displacement of the first and second hubs with respect to each other, and for a disconnect mode, displace the first and second hubs axially toward each other to enable rotation between the outer ring and the first and second hubs.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
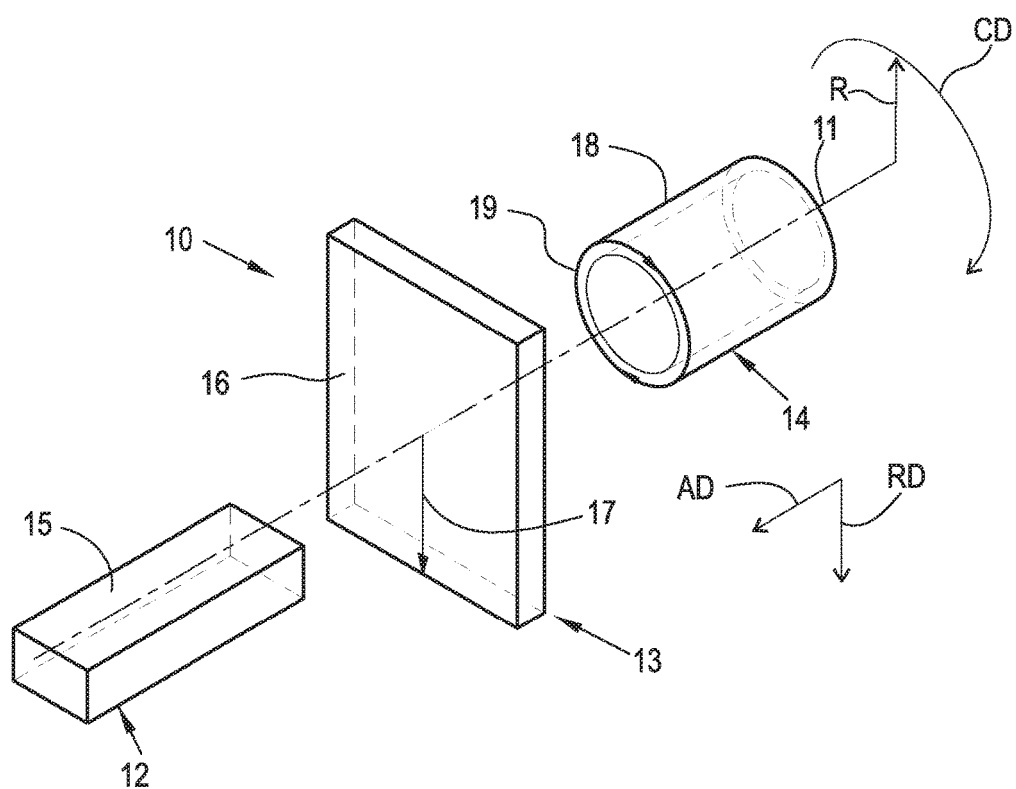
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
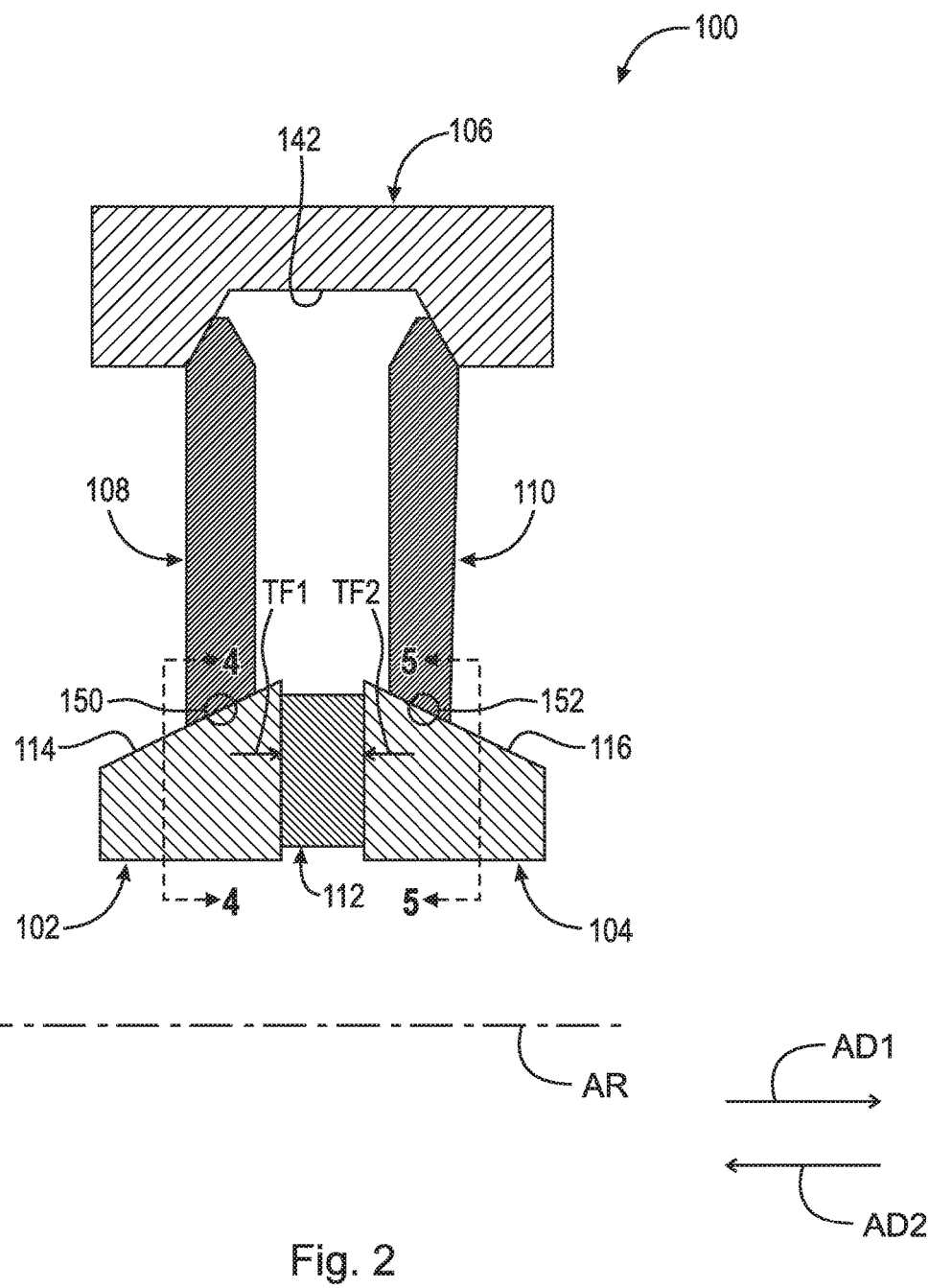
FIG. 2 is a partial cross-sectional view of a wedge clutch with axially displaceable hubs in a connect mode.

FIG. 2 is a partial cross-sectional view of wedge clutch 100 with axially displaceable hubs in a connect mode.

Figure 3:
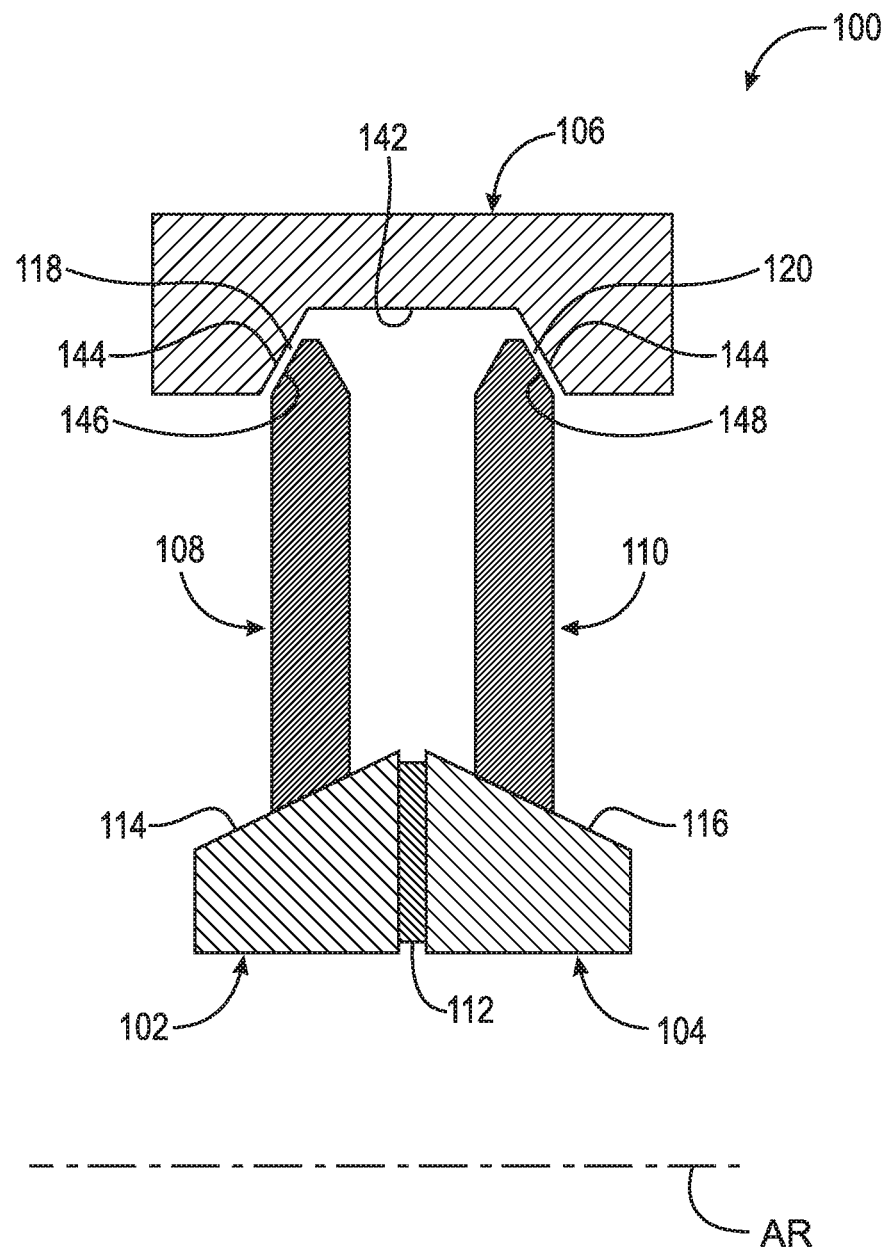
FIG. 3 is a partial cross-sectional view of the wedge clutch shown in FIG. 2 in a disconnect mode.

FIG. 3 is a partial cross-sectional view of wedge clutch 100 shown in FIG. 2 in a disconnect mode. The following should be viewed in light of FIGS. 2 and 3. Wedge clutch 100 includes: axis of rotation AR; hub 102; hub 104; outer ring 106 located radially outward of hubs 102 and 104; wedge plate 108; wedge plate 110; and displacement element 112 disposed between hubs 102 and 104. Wedge plate 108 is radially disposed between hub 102 and outer ring 106. Wedge plate 110 is radially disposed between hub 104 and outer ring 106. For the connect mode for clutch 100, in which hubs 102 and 104 are non-rotatably connected to outer ring 106, displacement element 112 is arranged to axially displace hub 102 and hub 104 with respect to each other to non-rotatably connect hub 102 and hub 104 to outer ring 106 and block axial displacement of hubs 102 and 104 with respect to each other. For a disconnect mode, displacement element 112 is arranged to axially displace hub 102 and hub 104 with respect to each other to enable rotation between outer ring 106 and hubs 102 and 104. By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

In an example embodiment, for the connect mode, displacement element 112 is arranged to axially displace hub 102 and hub 104 away from each other and to block axial displacement of hubs 102 and 104 toward each other. It should be understood that element 112 is not compressible in directions AD1 or AD2 by hubs 102 and 104, respectively, in the connect mode for wedge 100. In an example embodiment, for the disconnect mode, displacement element 112 is arranged to axially displace hub 102 and hub 104 toward each other.

In an example embodiment: hub 102 includes surface 114 sloping in axial direction AD1 and engaged with wedge plate 108, for example, surface 114 is in contact with wedge plate 108; and, hub 104 includes surface 116 sloping in axial direction AD2, opposite AD1, and engaged with wedge plate 110, for example, surface 116 is in contact with wedge plate 110. In an example embodiment: surface 114 slopes radially outward toward hub 104; and surface 116 slopes radially outward toward hub 102.

In an example embodiment, wedge plate 108 and wedge plate 110 are biased such that wedge plate 108 and wedge plate 110 are urged into contact with hub 102 and hub 104, respectively, for example, with surfaces 114 and 116, respectively. For the disconnect mode: surfaces 114 and 116 are arranged to slide along the wedge plate 108 and wedge plate 110, respectively; and, wedge plate 108 and wedge plate 110 are arranged to displace radially inward, for example, creating gap 118 between wedge plate 108 and outer ring 106 and creating gap 120 between wedge plate 110 and outer ring 106.

In an example embodiment, at least a portion of displacement element 112 is axially disposed between hubs 102 and 104. In an example embodiment, element 112 is an actuator selected from the group consisting of a mechanical actuator, a hydraulic actuator, an electrical actuator and a pneumatic actuator.

Figure 4:
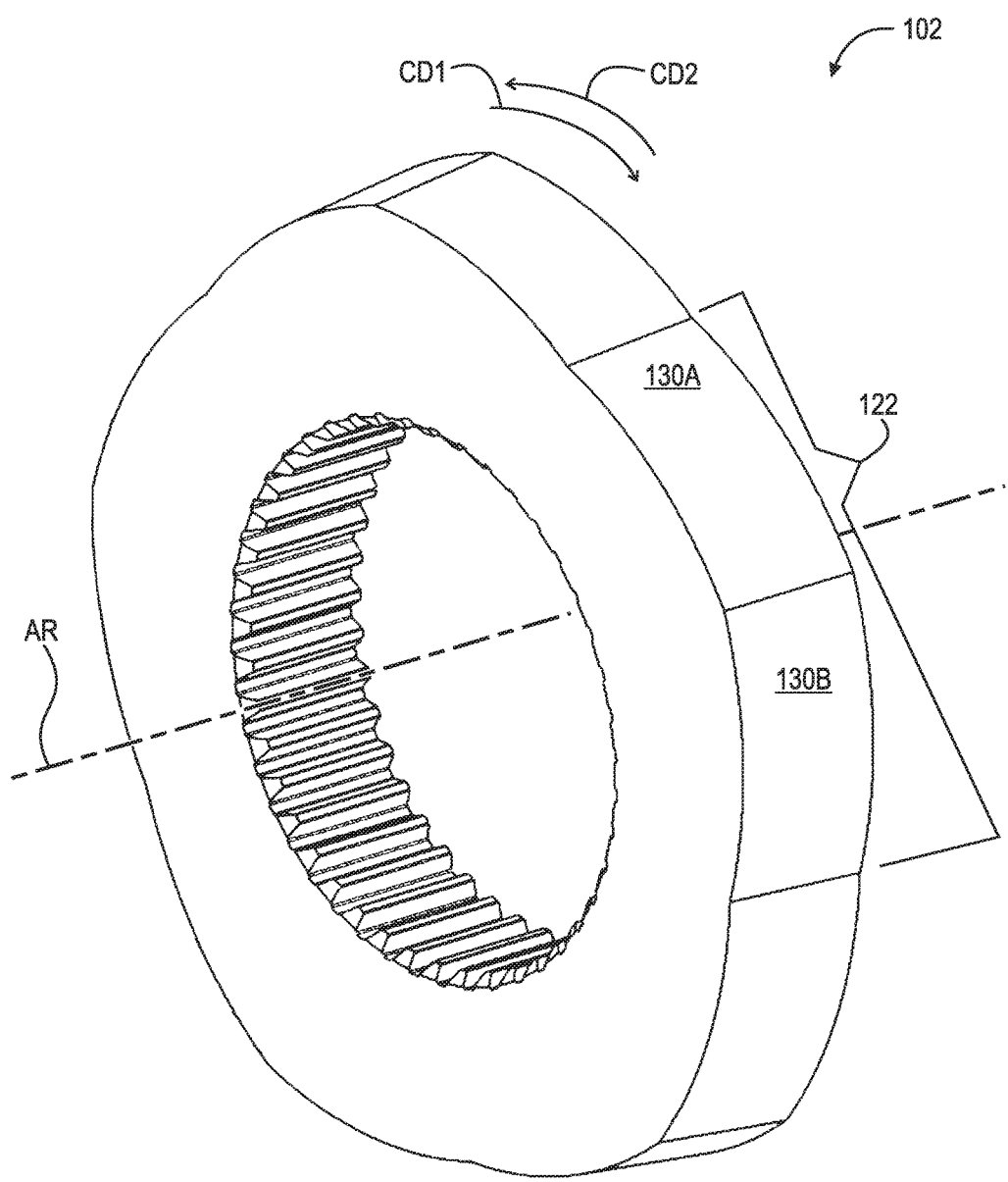
FIG. 4 is a cross-sectional view generally along line 4-4 in FIG. 2.

FIG. 4 is a cross-sectional view generally along line 4-4 in FIG. 2.

Figure 5:
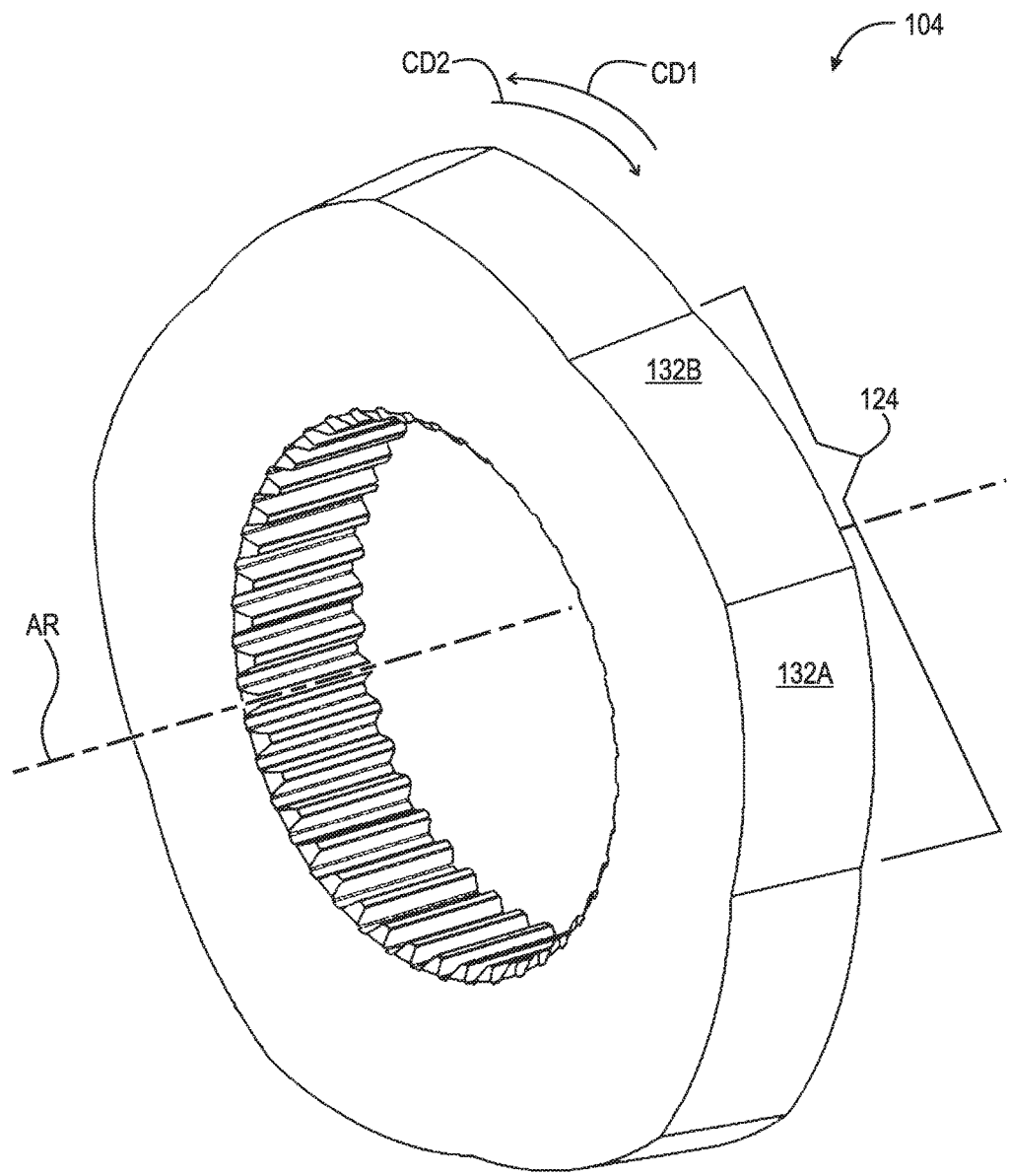
FIG. 5 is a cross-sectional view generally along line 5-5 in FIG. 2.

FIG. 5 is a cross-sectional view generally along line 5-5 in FIG. 2.

Figure 6:
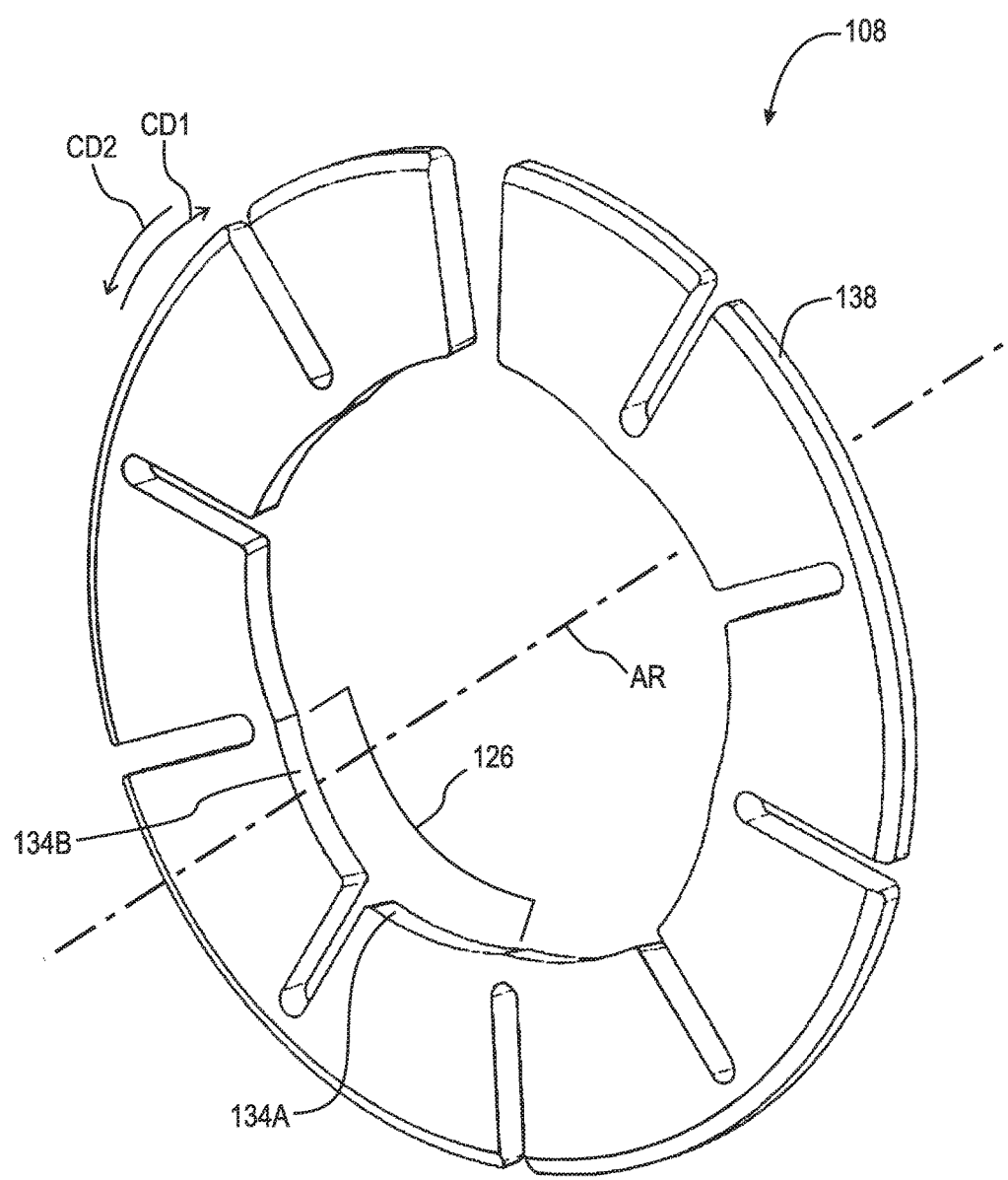
FIG. 6 is a front perspective view of the left-hand wedge plate shown in FIG. 2.

FIG. 6 is a front perspective view of wedge plate 108 shown in FIG. 2.

Figure 7:
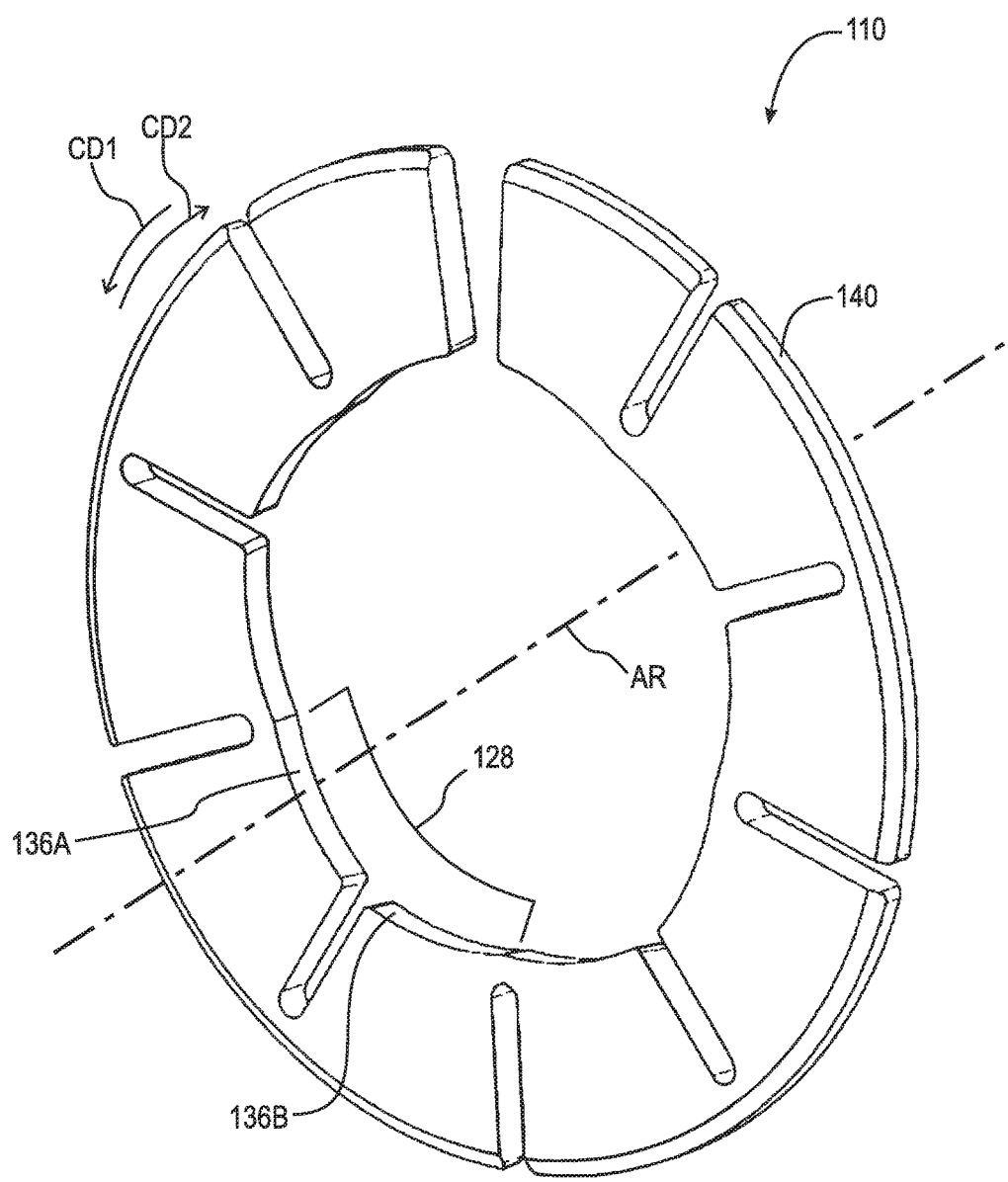
FIG. 7 is a back perspective view of the right-hand wedge plate shown in FIG. 2; and, FIG. 8 is a cross-sectional view of a prior art wedge clutch.
Figure 8:
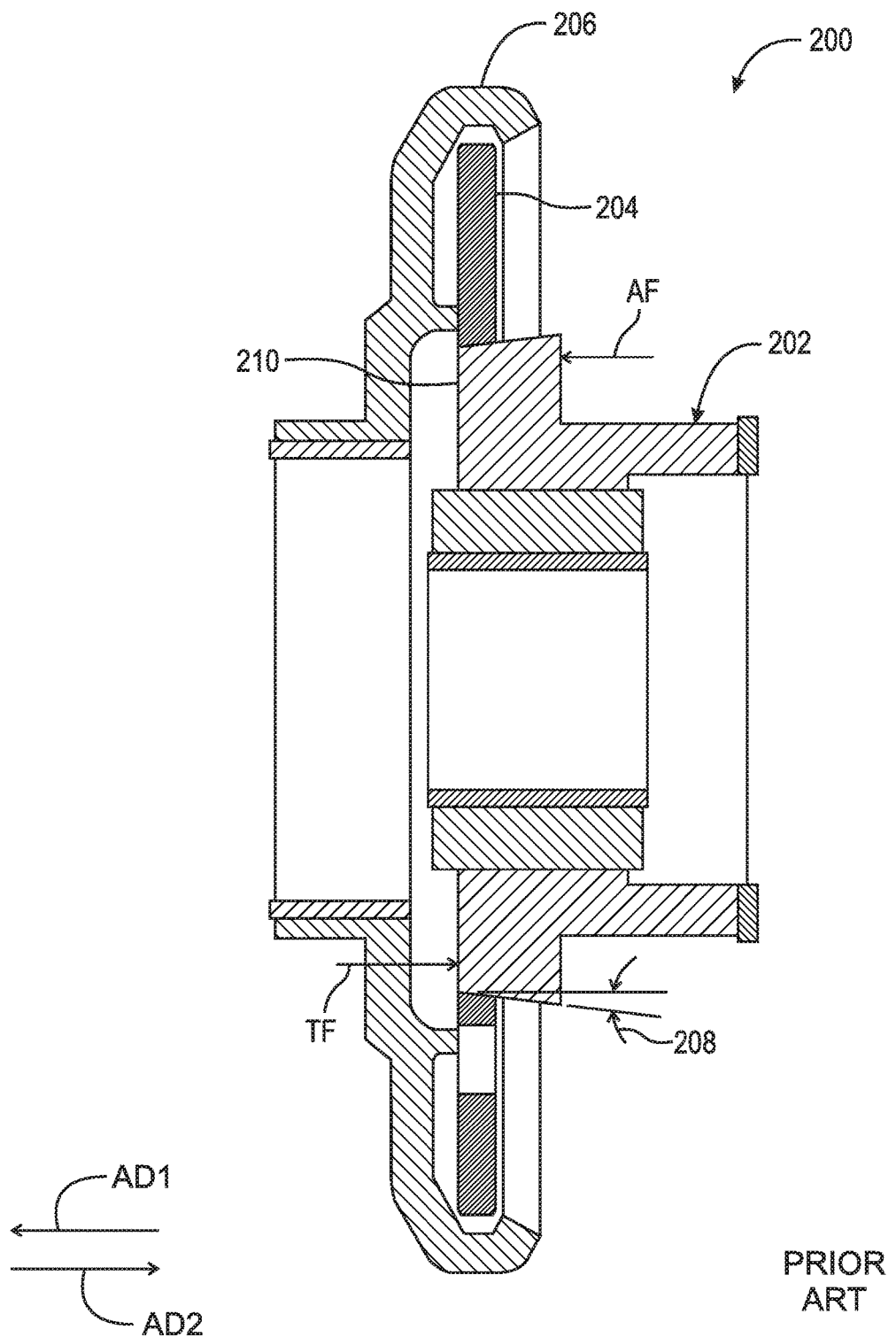

FIG. 7 is a back perspective view of wedge plate 110 shown in FIG. 2. The following should be viewed in light of FIGS. 2 through 7 In an example embodiment: hub 102 includes ramps, for example, ramp pairs 122; hub 104 includes ramps, for example ramp pairs 124; wedge plate 108 includes ramps, for example ramp pairs 126; and wedge plate 110 includes ramps, for example ramp pairs 128. Each ramp pair 122 includes ramp 130A extending radially outward in circumferential direction CD1 and ramp 130B extending radially outward in circumferential direction CD2. Each ramp pair 124 includes ramp 132A extending radially outward in circumferential direction CD1 and ramp 132B extending radially outward in circumferential direction CD2. Each ramp pair 126 includes ramp 134A extending radially outward in circumferential direction CD1 and ramp 134B extending radially outward in circumferential direction CD2. Each ramp pair 128 includes ramp 136A extending radially inward in circumferential direction CD1 and ramp 136B extending radially inward in circumferential direction CD2. Each ramp 130A is engaged with a respective ramp 134A. Each ramp 130B is engaged with a respective ramp 134B. Each ramp 132A is engaged with a respective ramp 136A. Each ramp 132B is engaged with a respective ramp 136B.

The following provides further detail regarding the structure and function of wedge clutch 100. Note that torque can be applied to: hubs 102 and 104 for transmission to ring 106; or ring 106 for transmission to hubs 102 and 104. For example, to initiate the connected mode as shown in FIG. 2, hubs 102 and 104 are axially displaced away from each other and torque is applied to hubs 102 and 104 in direction CD1. As hubs 102 and 104 axially displace away from each other, wedge plates 108 and 110 slide radially outwardly along surfaces 114 and 116, respectively. Outer circumferential surfaces 138 and 140 of plates 108 and 110, respectively, frictionally engage inner circumferential surface 142 of ring 106. Hubs 102 and 104 and wedge plates 108 and 110 are rotating relative to ring 106 in direction CD1. Therefore, the frictional engagement of plates 108 and 110 with ring 106 causes plates 108 and 110 to rotate with respect to hubs 102 and 104, respectively, causing ramps 134A and 136A to slide radially outwardly (slide up or climb) along ramps 130A and 132A, respectively, which in turn causes wedge plates 108 and 110 to expand radially outward. The radially outward expansion of wedge plates 108 and 110 causes wedge plates 108 and 110 to non-rotatably connect to ring 106 and to hubs 102 and 104.

In an example embodiment, surface 142 includes chamfers 144 and wedge plates 108 and 110 includes chamfered radially outer surfaces 146 and 148.

To initiate the disconnect mode shown in FIG. 4, hubs 102 and 104 are axially displaced toward each other and wedge plates 108 and 110 slide down surfaces 114 and 116, respectively, creating gaps 118 and 120. Since there is no contact between wedge plates 108 and 110 and ring 106, ring 106 and hubs 102 and 104 are able to rotate independently of each other. When the compressive force on wedge plates 108 and 110, associated with the connected mode, is released, wedge plates 108 and 110 slide down ramp pairs 122 and 124, respectively.

The discussion for torque applied in direction CD1 is applicable to torque applied in direction CD2. For example, to initiate the connected mode as shown in FIG. 2, torque is applied to hubs 102 and 104 in direction CD2 and hubs 102 and 104 are axially displaced away from each other. As hubs 102 and 104 axially displace toward each other, wedge plates 108 and 110 slide radially outwardly along surfaces 114 and 116, respectively. Outer circumferential surfaces 138 and 140 of plates 108 and 110, respectively, frictionally engage inner circumferential surface 142 of ring 106. Hubs 102 and 104 and wedge plates 108 and 110 are rotating relative to ring 106 in direction CD2. Therefore, the frictional engagement of plates 108 and 110 with ring 106 cause plates 108 and 110 to rotate with respect to hubs 102 and 104, respectively, causing ramps 134B and 136B to slide radially outwardly (slide up or climb) along ramps 130B and 132B, respectively, which in turn causes wedge plates 108 and 110 to expand radially outwardly. The radially outward expansion of wedge plates 108 and 110 causes wedge plates 108 and 110 to non-rotatably connect to ring 106 and to hubs 102 and 104. The discussion for the disconnect mode and torque in direction CD1 is applicable to the disconnect mode for torque in direction CD2.

Note that the above discussion regarding application of torque through hubs 102 and 104 is applicable to application of torque through ring 106.

Advantageously, the axial location of element 112 between hubs 102 and 104 and the non-compressibility of element 112 in the connect mode fixes the axial positions of hubs 102 and 104 with respect to each other in the connect mode. Returning to FIG. 2, for the connect mode, thrust forces TF1 and TF2, created by the tapers 150 and 152 between hub 102 and wedge plate 108 and between hub 104 and plate 110, respectively, urge hubs 102 and 104 in directions AD1 and AD2, respectively. Since these forces urge hubs 102 and 104 against element 112 and element 112 is not compressed by these forces, the axial positions of hubs 102 and 104, with respect to each other, are fixed. Further, forces TF1 and TF2 oppose each other and cancel each other out, ensuring that hubs 102 and 104 are not undesirably displaced as a unit in axial directions AD1 and AD2, respectively, with respect to plates 108 and 110, respectively. Thus, wedge plates 108 and 110 remain firmly non-rotatably connected to hubs 102 and 104, respectively, and to ring 106. Therefore, there is no unintentional and undesirable opening of clutch 100 during the connect mode. As a result, wedge clutch 100 solves the problem noted above of dual hubs in a wedge clutch being forced apart in a connect mode.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A wedge clutch, comprising: a first hub; a second hub; an outer ring located radially outward of the first and second hubs; a first wedge plate radially disposed between the first hub and the outer ring; a second wedge plate radially disposed between the second hub and the outer ring; and, a displacement element axially disposed between the first and second hubs and arranged to: for a connect mode, in which the first and second hubs are non-rotatably connected to the outer ring, block axial displacement of the first and second hubs with respect to each other; and, for a disconnect mode, axially displace the first and second hubs with respect to each other to enable rotation between the outer ring and the first and second hubs.

2. The wedge clutch of claim 1, wherein to transition from the disconnect mode to the connect mode, the displacement element is arranged to axially displace the first and second hubs with respect to each other.

3. The wedge clutch of claim 1, wherein: to transition from the disconnect mode to the connect mode, the displacement element is arranged to axially displace the first and second hubs away from each other; and, for the disconnect mode, the displacement element is arranged to axially displace the first and second hubs toward each other.

4. The wedge clutch of claim 1, wherein: the first hub includes a first surface sloping in a first axial direction and in contact with the first wedge plate; and, the second hub includes a second surface sloping in a second axial direction, opposite the first axial direction, and in contact with the second wedge plate.

5. The wedge clutch of claim 4, wherein: the first surface slopes radially outward toward the second hub; and, the second surface slopes radially outward toward the first hub.

6. The wedge clutch of claim 1, wherein: the first hub includes a first surface sloping in a first axial direction; the second hub includes a second surface sloping in a second axial direction, opposite the first axial direction; the first and second wedge plates are biased such that the first and second wedge plates are urged into contact with the first and second surfaces, respectively; and, for the disconnect mode: the first and second surfaces are arranged to slide along the first and second wedge plates; and, the first and second wedge plates are arranged to displace radially inward.

7. The wedge clutch of claim 1, wherein: the first hub includes a first surface sloping in a first axial direction; the second hub includes a second surface sloping in a second axial direction, opposite the first axial direction; the first and second wedge plates are biased such that the first and second wedge plates are urged into contact with the first and second surfaces, respectively; and, for the connect mode: the first and second surfaces are arranged to slide along the first and second wedge plates; and, the first and second wedge plates are arranged to displace radially outward.

8. The wedge clutch of claim 1, wherein at least a portion of the displacement element is axially disposed between the first and second hubs.

9. The wedge clutch of claim 7, wherein the displacement element includes an actuator selected from the group consisting of a mechanical actuator, a hydraulic actuator, an electrical actuator and a pneumatic actuator.

10. The wedge clutch of claim 1, wherein: the first hub includes a first plurality of ramps; the first wedge plate includes a second plurality of ramps engaged with the first plurality of ramps; the second hub includes a third plurality of ramps; the second wedge plate includes a fourth plurality of ramps engaged with the third plurality of ramps; and, for the connect mode, the second and fourth pluralities of ramps are arranged to slide radially outwardly along the first and third pluralities of ramps, respectively, in a first circumferential direction or in a second circumferential direction, opposite the first circumferential direction.

11. The wedge clutch of claim 1, wherein during the connect mode: a taper between the first hub and the first wedge plate is arranged to result in a first force urging the first hub in a first axial direction; and, a taper between the second hub and the second wedge plate is arranged to result in a second force: urging the second hub in a second axial direction, opposite the first axial direction; and, opposing the first force.

12. A wedge clutch, comprising: a first hub including a first surface sloping radially outward in a first axial direction; a second hub including a second surface sloping radially outward toward the first hub in a second axial direction, opposite the first axial direction; an outer ring located radially outward of the first and second hubs; a first wedge plate radially disposed between the first hub and the outer ring and engaged with the first surface; a second wedge plate radially disposed between the second hub and the outer ring and engaged with the second surface; and, a displacement element arranged to: for a connect mode, block axial displacement of the first and second hubs in the first and second axial directions, respectively; and, for a disconnect mode, axially displace the first and second hubs with respect to each other to enable rotation between the outer ring and the first and second hubs.

13. The wedge clutch of claim 12, wherein: for the connect mode: the displacement element is arranged to axially displace the first and second hubs in the second and first axial directions, respectively; and, the first and second hubs are arranged to displace the first and second wedge plates, respectively, radially outward; and, for the disconnect mode: the displacement element is arranged to axially displace the first and second hubs in the first and second axial directions, respectively; and, the first and second wedge plates are arranged to displace radially inward.

14. The wedge clutch of claim 12, wherein the displacement element is arranged to: for the connect mode, axially displace the first and second hubs away from each other; and, for the disconnect mode, axially displace the first and second hubs toward each other.

15. The wedge clutch of claim 12, wherein at least a portion of the displacement element is axially disposed between the first and second hubs.

16. The wedge clutch of claim 12, wherein: the first hub includes a first plurality of ramps; the first wedge plate includes a second plurality of ramps engaged with the first plurality of ramps; the second hub includes a third plurality of ramps; the second wedge plate includes a fourth plurality of ramps engaged with the third plurality of ramps; and, for the connect mode, the second and fourth pluralities of ramps are arranged to slide radially outwardly along the first and third pluralities of ramps, respectively, in a first circumferential direction or in a second circumferential direction, opposite the first circumferential direction.

17. The wedge clutch of claim 12, wherein during the connect mode: a taper between the first hub and the first wedge plate is arranged to result in a first force urging the first hub in the first axial direction; and, a taper between the second hub and the second wedge plate is arranged to result in a second force: urging the second hub in the second axial direction; and, opposing the first force.

18. A wedge clutch, comprising: a first hub; a second hub; an outer ring located radially outward of the first and second hubs; a first wedge plate radially disposed between the first hub and the outer ring and in contact with the first hub; a second wedge plate radially disposed between the second hub and the outer ring and in contact with the second hub; and, a displacement element arranged to: for a connect mode: displace the first and second hubs axially away from each other to non-rotatably connect the first and second hubs to the outer ring; and, block displacement of the first and second hubs axially toward each other; and, for a disconnect mode, displace the first and second hubs axially toward each other to enable rotation between the outer ring and the first and second hubs.

19. The wedge clutch of claim 18, wherein: the first hub includes a first surface sloping radially outward in a first axial direction and in contact with the first wedge plate; and, the second hub includes a second surface sloping radially outward in a second axial direction, opposite the first axial direction, and in contact with the second wedge plate.

20. The wedge clutch of claim 18, wherein at least a portion of the displacement element is axially disposed between the first and second hubs.

* * * * *